(12) United States Patent
Liese et al.

(10) Patent No.: US 12,319,777 B2
(45) Date of Patent: Jun. 3, 2025

(54) POLYURETHANE-POLYISOCYANURATE COMPOUND WITH OUTSTANDING MECHANICAL PROPERTIES

(71) Applicant: BASF SE, Ludwigshafen am Rhein (DE)

(72) Inventors: Julia Liese, Lemfoerde (DE); Stefan Bokern, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 594 days.

(21) Appl. No.: 17/634,681

(22) PCT Filed: Aug. 13, 2020

(86) PCT No.: PCT/EP2020/072810
§ 371 (c)(1),
(2) Date: Feb. 11, 2022

(87) PCT Pub. No.: WO2021/032603
PCT Pub. Date: Feb. 25, 2021

(65) Prior Publication Data
US 2022/0298286 A1    Sep. 22, 2022

(30) Foreign Application Priority Data

Aug. 19, 2019 (EP) .................................... 19192359

(51) Int. Cl.
| | | |
|---|---|---|
| *C08G 18/22* | (2006.01) | |
| *C08G 18/12* | (2006.01) | |
| *C08G 18/32* | (2006.01) | |
| *C08G 18/48* | (2006.01) | |
| *C08G 18/58* | (2006.01) | |
| *C08G 18/66* | (2006.01) | |
| *C08G 18/76* | (2006.01) | |

(52) U.S. Cl.
CPC ............ *C08G 18/12* (2013.01); *C08G 18/225* (2013.01); *C08G 18/3206* (2013.01); *C08G 18/4825* (2013.01); *C08G 18/58* (2013.01); *C08G 18/6674* (2013.01); *C08G 18/7671* (2013.01)

(58) Field of Classification Search
CPC .. C08G 18/225; C08G 18/12; C08G 18/6674; C08G 18/7671; C08G 18/58
See application file for complete search history.

(56) References Cited

U.S. PATENT DOCUMENTS

| | | | |
|---|---|---|---|
| 3,883,571 A | 5/1975 | Allport et al. | |
| 4,229,347 A | 10/1980 | Holt et al. | |
| 4,863,994 A * | 9/1989 | Nelson ............... | C08G 18/6535 |
| | | | 252/182.25 |
| 6,472,446 B1 * | 10/2002 | Riley ................... | C08G 18/482 |
| | | | 252/182.25 |
| 8,465,840 B2 | 6/2013 | Fader | |
| 9,334,379 B2 | 5/2016 | Lindner et al. | |
| 10,781,284 B2 | 9/2020 | Goeschel et al. | |
| 2009/0312447 A1* | 12/2009 | Hickey ................ | C08G 18/36 |
| | | | 521/131 |
| 2017/0267806 A1* | 9/2017 | Goeschel ........... | C08G 18/3206 |
| 2018/0148536 A1 | 5/2018 | Goeschel et al. | |

FOREIGN PATENT DOCUMENTS

| | | |
|---|---|---|
| EP | 2257580 A2 | 12/2010 |
| WO | 2002010250 A1 | 2/2002 |
| WO | 2010121898 A1 | 10/2010 |
| WO | 2011107367 A1 | 9/2011 |
| WO | 2012103965 A1 | 8/2012 |
| WO | 2013057070 A1 | 4/2013 |
| WO | 2013098034 A1 | 7/2013 |
| WO | 2013143841 A1 | 10/2013 |
| WO | 2016188805 A1 | 12/2016 |

OTHER PUBLICATIONS

European Search Report for EP Patent Application No. 19192359.8, Issued on Mar. 4, 2020, 3 pages.
International Search Report and Written Opinion for PCT/EP/2020/072810 mailed Nov. 20, 2020; 7 Pages.

* cited by examiner

*Primary Examiner* — Michael L Leonard
(74) *Attorney, Agent, or Firm* — Armstrong Teasdale LLP

(57) ABSTRACT

Described herein is a process for preparing a polyurethane-polyisocyanurate compound by mixing a) at least one polyisocyanate; b) a mixture (M); c) at least one compound including one or more epoxide groups; d) at least one aliphatic polyol (P1) having a high weight average molecular weight; e) at least one polyol (P2) having a low weight average molecular weight; f) at least one compatibilizer; and, optionally, g) fillers and further additives to form a reaction mixture (RM); and reacting the mixture (RM) to give the polyurethane-polyisocyanurate compound. Also described herein are a polyurethane-polyisocyanurate compound obtainable by the process and a method of using the polyurethane-polyisocyanurate compound for producing bodywork components for vehicles.

17 Claims, No Drawings

POLYURETHANE-POLYISOCYANURATE COMPOUND WITH OUTSTANDING MECHANICAL PROPERTIES

CROSS-REFERENCE TO RELATED APPLICATIONS

This application is a U.S. National Phase Application of International Patent Application No. PCT/EP2020/072810, filed Aug. 13, 2020, which claims priority to European Patent Application No. 19192359.8, filed Aug. 19, 2019, each of which is hereby incorporated by reference herein.

FIELD OF THE INVENTION

The presently claimed invention relates to a process for a preparing polyurethane-polyisocyanurate compound by mixing a) at least one polyisocyanate, b) a mixture obtainable by introducing an alkali metal or alkaline earth metal salt into a compound (Z), selected from the group, consisting of R—NH—CO—XR' (Z1), wherein R, and R' can be same or different and can be any radical known in organic chemistry and X is selected from the group consisting of NH, O and S, a compound having at least one —CO—NH—CO— group (Z2) and mixtures of (Z1) and (Z2), wherein the molar amount of the alkali metal and/or the alkaline earth metal ion in the mixture (M) per mole of the —NH—CO—X— group and —CO—NH—CO— group in the compound (Z) is in the range of ≥0.0001 to ≤3.5, based on the total number of the alkali metal and/or alkaline earth metal ions and the total number of —NH—CO—X— groups and —CO—NH—CO— groups, c) at least one compound comprising one or more epoxide groups, d) at least one aliphatic polyol (P1) having a number average molecular weight of >300 g/mol and e) at least one polyol (P2) having a number average molecular weight of ≤300 g/mol; and f) at least one compatibilizer; and, optionally, g) fillers and further additives to form a reaction mixture (RM) and reacting the mixture (RM) to give the polyurethane-polyisocyanurate compound; a polyurethane-polyisocyanurate compound obtainable by the process of the presently claimed invention, and the use of the polyurethane-polyisocyanurate compound for producing bodywork components for vehicles.

BACKGROUND OF THE INVENTION

Particularly for the production of plastics parts of large surface area, examples being fibre composites, a plastic system is required which has a long open time. Thus, for example, reinforcing agents, such as fibres or fibre mats made from glass or carbon, can be fully wetted, and the plastics system completely fill the mould, before the plastics system is cured to give the completed plastic. Another requirement, however, is that the plastics systems should cure very rapidly to give the plastic, thus enabling faster demoulding times and so increasing the profitability. Large-surface-area fibre composites of this kind are employed, for example, in automotive or aircraft construction or in the production of wind turbine rotor blades. An additional requirement, particularly with regard to components used as bodywork parts in vehicle construction, is that of high mechanical resistance and, in particular, impact toughness. The desire here in particular is for good mechanical properties with products having high glass transition temperatures, in order to ensure very largely constant mechanical properties over a wide temperature range. Generally speaking, the long open time required is achieved only by epoxy systems or unsaturated polyester systems, which, however, generally take a long time to cure.

Common production methods for such plastics parts of large surface areas are, for example, hand lamination, injection moulding, the resin injection process, also referred to as resin transfer moulding or RTM, or vacuum-assisted infusion processes, an example being the vacuum assisted resin transfer moulding (VARTM) process, or prepreg technology. Particularly preferred are vacuum-assisted infusion processes, since they allow the production of large components rapidly and in high quality.

The existing arts that use different catalyst to provide a plastic system with the desired open time are as follows:

EP 2257580 describes the use of acid-blocked amine catalysts in polyurethane systems for extending the open time in conjunction with rapid curing and the use of such a system in producing sandwich components. However, acid-blocked catalysts only allow the working time to be prolonged by a figure in the region of minutes. What is required, in contrast, is a working time of up to several hours.

WO 2013/057070 describes the production of fibre-reinforced polyisocyanurate components, using as catalyst, a latent reactive trimerization catalyst. Disadvantages of these components are an open time at room temperature which is still decidedly short, and also high brittleness.

WO 2010/121898 describes a polyisocyanate component which consists in parts of a urea prepolymer (—NH—CO—NH—) which is bidentate in respect of the anion, this prepolymer having been mixed with lithium chloride. When this component is mixed with a second component containing epoxide and polyol, and the resulting mixture is heated to 80-90° C., a rapid reaction occurs, leading to through-curing of the material.

WO 2012/103965 describes an epoxy-based system which is based on the same catalysis as described in WO 2010/121898. In this case, the groups needed for catalysis are defined, via the two hydrogen atoms located on the nitrogen, as a carboxamide group (—CO—NH$_2$), bidentate in respect of the anion, with LiCl.

WO 2013/098034 embraces a reactive mixture which as well as lithium halide requires a —(—CO—NH—CO—)— group which is bidentate in respect of the cation. The urea component described in this specification may also contain polydentate biuret groups (—NH—CO—NH—CO—NH—).

Described in WO 2013/143841 is a trimerization catalyst consisting of alkali metal or alkaline earth metal salts in combination with carboxamide groups of the structure —CO—NH2, which are bidentate in respect of the anion, or in combination with groups —(—CO—NH—CO—)—, which are bidentate in respect of the cation.

A disadvantage of the systems described in WO 2010/121898, WO 2012/103965, WO 2013/098034 and WO 2013/143841 is that the urea, carboxylate or biuret-blocked catalyst must be added in relatively large amounts in order to have sufficient activity. The materials obtained are relatively brittle and curing time at elevated temperature is still decidedly long.

These disadvantages of the existing arts have been addressed in WO 2016/188805 wherein the catalyst used for producing polyurethane-polyisocyanurate compounds is a mixture obtainable by introducing an alkali metal or alkaline earth metal salt into a compound R—NH—CO—R' containing urethane groups, where R is not hydrogen and is not COR". The molar amount of alkali metal and/or alkaline earth metal ions in the reaction mixture per mole of urethane group in the compound is 0.0001 to 3.5 and the isocyanate index is greater than 150. However, mechanical properties of the polyurethane-polyisocyanurate compounds may still be improved further.

Therefore, there is a need to provide a polyurethane-polyisocyanurate compound which has a sufficiently long open time combined with a short curing time at elevated temperatures along with outstanding mechanical properties.

OBJECT OF THE INVENTION

It is an object of the presently claimed invention to provide a process for producing a polyurethane-polyisocyanurate compound which has a sufficiently long open time combined with a short curing time at elevated temperatures along with outstanding mechanical properties as flexural strength, elasticity and tensile strength. Further, a high glass transition temperature $T_g$ is desired.

SUMMARY OF THE INVENTION

The object has been solved by using a reaction mixture that besides polyols and polyisocyanates comprises compatibilizers selected from the group consisting of at least one aromatic polyol (P3) comprising aromatic groups in the range of ≥5 wt. % to ≤80 wt. % based on the total weight of the aromatic polyol (P3); and at least one monool (P4) with an average molecular weight in the range of ≥200 g/mol to ≤1000 g/mol;

Accordingly, in one embodiment, the presently claimed invention is directed to a process for preparing a polyurethane-polyisocyanurate comprising:
A) mixing the following components to form a reaction mixture (RM) comprising
   a) at least one polyisocyanate,
   b) a mixture (M) obtainable by introducing an alkali metal and/or an alkaline earth metal salt into a compound (Z), selected from
      R—NH—CO—XR' (Z1), wherein R, and R' can be same or different and can be any radical known in organic chemistry and X is selected from the group consisting of NH, O or S,
      a compound having at least one —CO—NH—CO— group (Z2) or
      mixtures of (Z1) and (Z2),
      wherein the molar amount of the alkali metal and/or the alkaline earth metal ion in the mixture (M) per mole of the —NH—CO—X— group and —CO—NH—CO— group in the compound (Z) is in the range of ≥0.0001 to ≤3.5, based on the total number of the alkali metal and/or alkaline earth metal ions and the total number of —NH—CO—X— groups and —CO—NH—CO— groups,
   c) at least one compound (E) comprising one or more epoxide groups,
   d) at least one aliphatic polyol (P1) having a number average molecular weight of >300 g/mol,
   e) at least one polyol (P2) selected from the group consisting of:
      i. at least one aliphatic diol having a number average molecular weight of ≤300 g/mol; and
      ii. at least one cycloaliphatic diol having an average molecular weight of ≤300 g/mol;
   f) at least one compatibilizer selected from the group consisting of:
      i. at least one aromatic polyol (P3) comprising aromatic groups in the range of ≥5 wt. % to ≤80 wt. % based on the total weight of the aromatic polyol (P3); and
      ii. at least one monool (P4) with an average molecular weight in the range of ≥200 g/mol to ≤1000 g/mol;
   and
B) reacting the reaction mixture (RM) to form the polyurethane-polyisocyanurate compound.

In a preferred embodiment of the presently claimed invention, the reaction mixture is reacted at an isocyanate index in the range of ≥300 to ≤1300.

In another embodiment of the presently claimed invention, the at least one aliphatic polyol (P1) has a number average molecular weight in the range of ≥500 g/mol to ≤8000 g/mol.

In another embodiment of the presently claimed invention, the at least one aliphatic polyol (P1) has a hydroxyl number in the range of ≥20 to ≤850 mg KOH/g.

In another embodiment of the presently claimed invention, the at least one polyol (P2) has a number average molecular weight in the range of ≥60 g/mol to ≤300 g/mol.

In another embodiment of the presently claimed invention, the at least one polyol (P2) has a hydroxyl number in the range of ≥600 to ≤2000 mg KOH/g.

In another embodiment of the presently claimed invention, the at least one aromatic polyol (P3) comprises aromatic groups in the range of ≥30 wt. % to ≤80 wt. % based on the total weight of the aromatic polyol (P3).

In another embodiment of the presently claimed invention, the at least one aromatic polyol (P3) has a number average molecular weight in the range of ≥200 g/mol to ≤1000 g/mol.

In another embodiment of the presently claimed invention, the at least one aromatic polyol (P3) has a hydroxyl number in the range of ≥150 to ≤800 mg KOH/g.

In another embodiment of the presently claimed invention, the at least one monool (P4) is an alkylene oxide adduct of an active hydrogen-containing compound (H), wherein 40% or more of hydroxyl groups are primary hydroxyl groups.

In another embodiment of the presently claimed invention, the at least one monool (P4) has a hydroxyl number in the range of ≥50 to ≤500 mg KOH/g.

In another embodiment of the presently claimed invention, the at least one compatibilizer is present in an amount in the range of ≥10 wt. % to ≤60 wt. % based on the total weight of the components (c) to (f).

In another embodiment of the presently claimed invention, the mixture (M) of step (b) is present in an amount in the range of ≥1 wt. % to ≤15 wt. % based on the total weight of the components (a) and (b).

In another embodiment of the presently claimed invention, mixture (M) is obtainable by introducing an alkali metal or alkaline earth metal salt into a compound R—NH—CO—XR' (Z1), wherein X stands for O.

In another embodiment of the presently claimed invention, the alkali metal or alkaline earth metal salt is a salt of sodium, lithium, magnesium and potassium, preferably lithium halide and especially preferred lithium chloride.

In another embodiment of the presently claimed invention, the at least one compound (E) comprising one or more epoxide groups has a number average molecular weight in the range of >300 g/mol to ≤8000 g/mol.

In another embodiment of the presently claimed invention, the at least one compound (E) comprising one or more epoxide groups is present in an amount in the range of ≥3 wt. % to ≤20 wt. % based on the total weight of the components (c) to (f).

In another embodiment of the presently claimed invention, the at least one aliphatic polyol (P1) is present in an amount in the range of ≥40 wt. % to ≤70 wt. % based on the total weight of the components (c) to (f).

In another embodiment of the presently claimed invention, the at least one polyol (P2) is present in an amount in the range of ≥4 wt. % to ≤30 wt. % based on the total weight of the components (c) to (f).

Accordingly, in another embodiment of the presently claimed invention, the reaction mixture (RM) further comprises fillers and additives.

In another embodiment of the presently claimed invention, the fillers are selected from the group consisting of charcoal, melamine, resin, cyclopentadienyl resins, graft polymers, cellulose fibers, polyamide, polyacrylonitrile, polyurethane, polyester fibers based on aromatic and/or aliphatic dicarboxylic esters, finely ground quartzes, antigorite, serpentine, hornblendes, amphibols, chrysotile, talc, kaolin, aluminum oxides, titanium oxides, iron oxides, chalk, heavy spar, cadmium sulfide, zinc sulfide, wollastonite, metal fibers, glass fibers, coprecipitates of barium sulfate and aluminum silicate and/or aluminum silicate.

In another embodiment of the presently claimed invention, the additives are selected from the group consisting of additives for water adsorption, flame retardants, hydrolysis inhibitors, antioxidants, and internal mold release agents.

Accordingly, in another embodiment, the presently claimed invention is directed to a polyurethane-polyisocyanurate compound obtainable according to the process of the presently claimed invention.

In one preferred embodiment of the presently claimed invention, the polyurethane-polyisocyanurate compound has
i. a heat distortion temperature in the range of ≥140° C. to ≤200° C. determined by DIN EN ISO 6721-1:2011 at a frequency f=1 Hz.;
ii. a tensile strength in the range of ≥55 N/mm$^2$ to ≤80 N/mm$^2$, preferably in the range of ≥60 N/mm$^2$ to ≤78 N/mm$^2$, determined according to DIN EN ISO 527; and
iii. an e-modulus of ≥2000 N/mm$^2$ determined according to DIN EN ISO 527.

In one preferred embodiment of the presently claimed invention, the polyurethane-polyisocyanurate compound exhibits a glass transition temperature in the range of ≥180° C. to ≤250° C., preferably of ≥215° C. to ≤250° C., the glass transition temperature is determined by a Dynamic Mechanical Analysis (DMA) at a frequency f=1 Hz. in accordance with DIN EN ISO 6721-1:2011.

In one preferred embodiment of the presently claimed invention, the polyurethane-polyisocyanurate compound exhibits an open time at room temperature in the range of ≥5 minutes to ≤3000 minutes, preferably of ≥20 minutes to ≤3000 minutes, the open time is determined by Shyodu gel timer, model 100, version 2012. For this purpose 200 g portions of reaction mixture were prepared, and were mixed in a Speedmixer at 1950 rpm for 1 minute, and 130 g of the mixture were stirred at room temperature or elevated reaction temperature in the oven, in a PP beaker with a diameter of 7 cm, by means of a Shyodu Gel Timer, model 100, version 2012 and an associated wire stirrer at 20 rpm, until the viscosity and hence the required stirring force for the reactive mixture exceeded the stirring force of the Gel Timer.

Accordingly, in another embodiment, the presently claimed invention is directed to use of a polyurethane-polyisocyanurate compound for producing bodywork components for vehicles.

DETAILED DESCRIPTION OF THE INVENTION

If hereinafter a group is defined to comprise at least a certain number of embodiments, this is meant to also encompass a group which preferably consists of these embodiments only. Furthermore, the terms "first" and "second", or "(A)" and "(B)", or "(a)", "(b)", "(c)", "(d)" etc. and the like in the description and in the claims, are used for distinguishing between similar elements and not necessarily for describing a sequential or chronological order. It is to be understood that the terms so used are interchangeable under appropriate circumstances and that the embodiments of the presently claimed invention described herein are capable of operation in other sequences than described or illustrated herein. In case the terms "first" and "second", or "(A)" and "(B)", or "(a)", "(b)", "(c)", "(d)", "(e)" and "(f)", or "i", "ii" and "iii", etc. relate to steps of a process or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

In the following passages, different aspects of the presently claimed invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the presently claimed invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the presently claimed invention, and form different embodiments, as would be understood by those in the art. For example, in the appended claims, any of the claimed embodiments can be used in any combination.

Polyisocyanates (a), also referred to below as first isocyanate (a), encompass all aliphatic, cycloaliphatic and aromatic isocyanates that are known for the preparation of polyurethanes. They preferably have an average functionality of less than 2.5. Examples are 2,2'-, 2,4'- and 4,4'-diphenylmethane diisocyanate, the mixtures of monomeric diphenylmethane diisocyanates and higher polycyclic homologues of diphenylmethane diisocyanate (polymeric MDI), isophorone diisocyanate (IPDI) or oligomers thereof, 2,4- or 2,6-tolylene diisocyanate (TDI) or mixtures thereof, tetramethylene diisocyanate or its oligomers, hexamethylene diisocyanate (HDI) or its oligomers, naphthylene diisocyanate (NDI), or mixtures thereof.

Preferably, the polyisocyanates (a) is monomeric diphenylmethane diisocyanate, for example 2,2'-diphenylmethane diisocyanate, 2,4'-diphenylmethane diisocyanate, 4,4'-diphenylmethane diisocyanate or mixtures thereof. Diphenylmethane diisocyanate here may also be used as a mixture with its derivatives. In that case, diphenylmethane diisocyanate may more preferably comprise up to 10 wt. %, with further particular preference up to 5 wt. %, of carbodiimide-, uretdione- or uretonimine-modified diphenylmethane diisocyanate, especially carbodiimide-modified diphenylmethane diisocyanate.

Polyisocyanates (a) may also be used in the form of polyisocyanate prepolymers. These polyisocyanate prepolymers are obtainable by reacting above-described polyisocyanates (constituent (a-1)) in excess, for example at temperatures in the range of ≥30 to ≤100° C., preferably at 80° C., with polyols (constituent (a-2)), to form the prepolymer. The NCO content of polyisocyanate prepolymers of the presently claimed invention is in the range of ≥5 to ≤32 wt. % of NCO, preferably ≥15 to ≤28 wt. % of NCO. Polyisocyanates of this kind are commercially available, for example, from BASF under the trade name Lupranat® MP 102.

Polyols (a-2) are known to the skilled person and are described for example in "Kunststoffhandbuch, 7, Polyurethane", Cad Hanser-Verlag, 3rd edition 1993, section 3.1. Examples of polyols which can be used, accordingly, are polyetherols or polyesterols, such as the polyols described below. Preferred polyols (a-2) used are polyols containing secondary OH groups, such as polypropylene oxide, for example. These polyols (a-2) preferably possess a functionality in the range of ≥2 to ≤6, more preferably in the range of ≥2 to ≤4 and even more preferably in the range of ≥2 to ≤3.

It is additionally possible, optionally, for chain extenders (a-3) to be added to the reaction to form the polyisocyanate prepolymer. Suitable chain extenders (a-3) for the prepolymer are dihydric or trihydric alcohols, for example dipropylene glycol and/or tripropylene glycol, or the adducts of dipropylene glycol and/or tripropylene glycol with alkylene oxides, preferably dipropylene glycol.

Polyisocyanate prepolymers of these kinds are described for example in U.S. Pat. No. 3,883,571, WO 2002/10250 and U.S. Pat. No. 4,229,347.

Particularly preferred for use as polyisocyanate (a) is diphenylmethane diisocyanate or a polyisocyanate prepolymer based on monomeric 4,4'-diphenylmethane diisocyanate or mixtures of 4,4'-diphenylmethane diisocyanate with its derivatives and polypropylene oxide having a functionality of ≥2 to ≤4, and also, optionally, dipropylene glycol.

Preferably, polyisocyanates (a) used in the presently claimed invention are commercially available, for example, from BASF under the trade name Lupranat® MP 102, Lupranat® MM103 or "Lupranat® M20" (diphenylmethane diisocyanate (MDI) with more highly polycyclic homologs with NCO content 31.5%).

Employed as component (b) is a mixture (M) obtainable by introducing an alkali metal and/or alkaline earth metal salt into a compound (Z), selected from the group, consisting of R—NH—CO—XR' (Z1), wherein R, and R' can be same or different and can be any radical known in organic chemistry and X is selected from the group consisting of NH, O and S, a compound having at least one —CO—NH—CO— group (Z2) and mixtures of (Z1) and (Z2). Preferably compound (Z) is a compound R—NH—CO—XR' (Z1), wherein R, and R' can be same or different and can be any radical known in organic chemistry and X is O. In this case the Compound (Z) comprises at lease one urethane group [—NH—CO—O—].

The alkali metal or alkaline earth metal salt used in this context is a compound which accelerates the reaction between isocyanates (a), the compounds (E) containing one or more epoxide groups, the at least one aliphatic polyol (P1) having a number average molecular weight of >300 g/mol, the at least one polyol (P2) and the at least one compatibilizer. These compounds encompass, in particular, salts of sodium, lithium, magnesium and potassium, and ammonium compounds, preferably lithium or magnesium, with any desired anions, preferably with anions of organic acids such as carboxylates and, more preferably, of inorganic acids, such as nitrates, halides, sulfates, sulfites and phosphates, more preferably still with anions of monoprotic acids, such as nitrates or halides, and especially nitrates, chlorides, bromides or iodides. Alkali metal hydroxides as well can be used. Preference is given to using lithium chloride, lithium bromide and magnesium dichloride, and especially lithium chloride. Alkali metal or alkaline earth metal salts of the presently claimed invention may be used individually or as mixtures.

Besides the alkali metal or alkaline earth metal salt, there are preferably no further compounds used which accelerate the reaction of isocyanates with isocyanate-reactive groups such as conventional polyurethane catalysts as amine catalysts or metal catalysts.

The compound (Z) is understood to comprise any desired compounds which at 20° C. are present in solid or liquid form and contain at least one of a compound R—NH—CO—XR' (Z1), wherein R, and R' can be same or different and can be any radical known in organic chemistry and X is selected from the group consisting of NH, O and S, and a compound having at least one —CO—NH—CO— group (Z2) and mixtures of (Z1) and (Z2). R and R' preferably, independently of one another, are substituted or unsubstituted hydrocarbyl radicals having preferably 1 to 50 carbon atoms. Preferred in this context are compounds which are liquid at 50° C., more preferably at room temperature. For the purposes of the presently claimed invention, a substance or component which is "liquid" is one which at the specified temperature has a viscosity of not more than 10 Pas. If no temperature is specified, the datum is based on 20° C. Measurement in this context takes place in accordance with ASTM D445-11. Such compounds are known and for example disclosed in, WO 2012/103965, WO 2013/098034, WO 2013/143841 and WO 2016/188805.

In an especially preferred embodiment compound (Z) comprises at least one urethane group R—NH—CO—O—R'. R and R' here are organic radicals, and R is not hydrogen and is not —COR", R" standing for any radical known in organic chemistry. The compound (Z) containing urethane groups is preferably obtainable by reaction of a second polyisocyanate and a compound having at least one OH group. The compounds containing urethane groups preferably have at least two urethane groups.

The molecular weight of the compounds (Z) is preferably in the range ≥200 to ≤15000 g/mol, more preferably ≥300 to ≤10000 g/mol and more particularly ≥500 to ≤1300 g/mol.

Compounds (Z) containing urethane groups may be obtained, for example, by reaction of aforementioned isocyanates (a-1) as second isocyanate with compounds which have at least one isocyanate-reactive hydrogen atom, such as alcohols, for example monoalcohols, such as methanol, ethanol, propanol, butanol, pentanol, hexanol or longer-chain propoxylated or ethoxylated monools, such as polyethylene oxide) monomethyl ethers, such as the monofunctional Pluriol® products from BASF, for example, dialcohols, such as ethylene glycol, diethylene glycol, triethylene glycol, propylene glycol, dipropylene glycol, butanediol, hexanediol, and/or reaction products of said isocyanates with the polyols and/or chain extenders described below—individually or in mixtures. For preparing the compound containing urethane groups it is possible to employ not only isocyanates but also polyols in a stoichiometric excess. Where monoalcohols are used, isocyanate groups and OH groups may also be used in a stoichiometric ratio. Preference is given to using monoalcohols.

Where the compound (Z) containing urethane groups has two or more isocyanate groups per molecule, these groups may wholly or partly replace the polyisocyanates (a). The reaction of the second isocyanate with compounds which have at least one isocyanate-reactive hydrogen atom takes place customarily at temperatures in the range of ≥20 and ≤120° C., as for example at 80° C. The second isocyanate used for preparing the compound containing urethane groups is preferably an isomer or homologue of diphenylmethane diisocyanate. With particular preference, the second isocyanate is monomeric diphenylmethane diisocyanate, for example 2,2'-diphenylmethane diisocyanate, 2,4'-diphenylmethane diisocyanate, 4,4'-diphenylmethane diisocyanate or a mixture thereof. Diphenylmethane diisocyanate in this case may also be used as a mixture with its derivatives. Diphenylmethane diisocyanate here may with particular preference contain up to 10 wt. %, with further particular preference up to 5 wt. %, of carbodiimide-, uretdione-, or uretonimine-modified diphenylmethane diisocyanate, especially carbodiimido-modified diphenylmethane diisocyanate. In one particularly preferred embodiment, the first isocyanate (a) and the second isocyanate for preparing the compound containing urethane groups are identical.

The compound (Z) containing urethane groups may also be obtained via alternative reaction pathways, as for example by reacting a carbonate with a monoamine to produce a urethane group. For this purpose, for example, a propylene carbonate is reacted in a slight excess (1.1 eq) with a monoamine, e.g. a Jeffamin® M 600, at 100° C. The resultant urethane may likewise be employed as compound containing urethane group.

The mixtures (M) comprising the alkali metal or alkaline earth metal salt and a compound (Z) may be obtained, for example, by mixing the alkali metal or alkaline earth metal salt into the compound (Z), preferably in the liquid state, for example at room temperature or at elevated temperature. This can be done using any mixer, an example being a simple stirrer. In this case, the alkali metal or alkaline earth metal salt may be employed as the pure substance or in the form of a solution, for example in mono- or polyfunctional alcohols, such as methanol, ethanol or chain extender, or water. In one particularly preferred embodiment, the dissolved salt is added directly to commercially available, prepolymer-based isocyanate. Suitability for this purpose is possessed for example by isocyanate prepolymers having an NCO content of ≥15 to ≤30%, based in particular on diphenylmethane diisocyanate and a polyether polyol. Isocyanates of this kind are commercially available, for example, from BASF under the trade name Lupranat® MP 102.

In one particularly preferred embodiment of the presently claimed invention, the alkali metal or alkaline earth metal salt is dissolved in a compound having isocyanate-reactive hydrogen atoms, and this solution is then mixed with the isocyanate, optionally at elevated temperature to produce the mixture (M).

With particular preference, the compound (Z) containing urethane groups is preferably prepared using a monool having a molecular weight in the range of ≥30 to ≤15000 g/mol, more preferably ≥100 to ≤900 g/mol and, in one particularly preferred embodiment, of ≥400 to ≤600 g/mol and reacting this monool with the second isocyanate.

The molar amount of alkali metal or alkaline earth metal ions per mole of the —NH—CO—X— group and —CO—NH—CO— group in the compound (Z) in the reaction mixture (M) is in the range of ≥0.0001 to ≤3.5, preferably ≥0.01 to ≤1.0, more preferably ≥0.05 to ≤0.9 and even more preferably ≥0.3 to ≤0.8.

The molar amount of alkali metal or alkaline earth metal ions per mole of isocyanate group in the first polyisocyanate (a) and also, if present, in the complex compound (Z) is in the range of preferably ≥0.0001 to ≤0.3, more preferably ≥0.0005 to ≤0.02 and more particularly ≥0.001 to ≤0.01.

Between the alkali metal or alkaline earth metal salt in the reaction mixture (M) there is preferably, at 25° C., a thermally reversible interaction with the compound (Z), whereas at temperatures of preferably ≥50° C., more preferably ≥60 to ≤200° C. and even more preferably ≥80 to ≤200° C., the catalytically active compound is in free form. For the purposes of the presently claimed invention, a thermally reversible interaction is assumed if the open time of the reaction mixture at 25° C. is longer by a factor of at least 5, more preferably at least 10 and more particularly at least 20 than at 130° C. The open time here is defined as the time within which the viscosity of the reaction mixture at constant temperature increases to an extent such that the required stirring force exceeds the given stirring force of the Shyodu Gel Timer, model 100, version 2012. For this purpose 200 g portions of reaction mixture were prepared, and were mixed in a Speed mixer at 1950 rpm for 1 minute, and 130 g of the mixture were stirred at room temperature or elevated reaction temperature in the oven, in a PP beaker with a diameter of 7 cm, by means of a Shyodu Gel Timer, model 100, version 2012 and an associated wire stirrer at 20 rpm, until the viscosity and hence the required stirring force for the reactive mixture exceeded the stirring force of the Gel Timer.

Preferably, the mixture (M) of step (b) is present in an amount in the range of ≥0.1 wt. % to ≤5 wt. % based on the total weight of the components (a) and (b).

As compound (E) contains one or more epoxide groups it is possible to use all epoxide-containing compounds which are customarily used for preparing epoxy resins. The compounds (E) containing epoxide groups are preferably liquid at 25° C. It is also possible to use mixtures of such compounds, which are preferably likewise liquid at 25° C.

Examples of those compounds containing epoxide groups that can be used for the purposes of the presently claimed invention are:

I) Polyglycidyl and poly([beta]-methylglycidyl) esters, obtainable by reacting a compound having at least two carboxyl groups in the molecule with in each case epichlorohydrin and [beta]-methylepichlorohydrin. This reaction is advantageously catalysed by the presence of bases.

Aliphatic polycarboxylic acids may be used, for example, as a compound having at least two carboxyl groups. Examples of such aliphatic polycarboxylic acids are oxalic acid, succinic acid, glutaric acid, adipic acid, pimelic acid, suberic acid, azeleic acid and dimerized or trimerized linoleic acid. Additionally, it is possible for cyclic, aliphatic acids to be used as well, such as tetrahydrophthalic acid, 4-methyltetrahydrophthalic acid, hexahydrophthalic acid or 4-methylhexahydrophthalic acid. Aromatic carboxylic acids too, such as phthalic acid, isophthalic acid or terephthalic acid, and also any desired mixtures of these carboxylic acids, may be used.

II) Polyglycidyl or poly([beta]-methylglycidyl) ether, obtainable by reaction of a compound having at least two alcohol hydroxyl groups and/or phenolic hydroxyl groups with epichlorohydrin or [beta]-methylepichlorohydrin under alkaline conditions or in the presence of an acidic catalyst, and subsequent treatment with a base.

The glycidyl ethers of this type are derived for example from linear alcohols, such as ethylene glycol, diethylene glycol or higher polyoxyethylene) glycols, propane-1,2-diol or poly(oxypropylene) glycols, propane-1,3-diol, butane-1,4-diol, poly(oxytetramethylene) glycol, pentane-1,5-diol, hexane-1,6-diol, hexane-2,4,6-triol, glycerol, 1,1,1-trimethylolpropane, pentaerythritol or sorbitol, and from polyepichlorohydrins.

Further glycidyl ethers of this type are obtainable from cycloaliphatic alcohols, such as 1,4-cyclohexanedimethanol, bis(4-hydroxycyclohexyl)methane or 2,2-bis(4-hydroxycyclo-hexyl)propane, or from alcohols which carry aromatic groups and/or other functional groups, such as N,N-bis(2-hydroxyethyl)aniline or p,p'-bis(2-hydroxyethylamino)diphenylmethane.

The glycidyl ethers may also be based on monocyclic phenols, such as p-tert-butylphenol, resorcinol or hydroquinone, or on polycyclic phenols, such as bis(4-hydroxyphenyl)methane, 4,4'-dihydroxybiphenyl, bis(4-hydroxyphenyl) sulfone, 1,1,2,2-tetrakis(4-hydroxyphenyl)ethane, 2,2-bis(4-hydroxyphenyl)propane or 2,2-bis(3,5-dibromo-4-hydroxyphenyl)propane.

Further compounds containing hydroxyl groups and suitable for the preparation of the glycidyl ethers are novolacs, obtainable by condensing aldehydes, such as formaldehyde, acetaldehyde, chloraldehyde or furfuraldehyde, with phenols or bisphenols, which may be unsubstituted or substituted, by chlorine atoms or C1 to C9 alkyl groups, for example, such as phenol, 4-chlorophenol, 2-methylphenol or 4-tert-butylphenol.

III) Poly(N-glycidyl) compounds, obtainable by dehydrochlorination of reaction products of epichlorohydrin with amines containing at least two amine-bonded hydrogen atoms. Such amines are, for example, aniline, n-butylamine, bis(4-aminophenyl)methane, m-xylenediamine or bis(4-methylaminophenyl)methane. The poly(N-glycidyl) compounds also include triglycidyl isocyanurates, N,N'-diglycidyl derivatives of cycloalkyleneureas, like ethyleneurea or 1,3-propyleneurea, and diglycidyl derivatives of hydantoins, like 5,5-dimethylhydantoin.

IV) Poly(S-glycidyl) compounds, such as di-S-glycidyl derivates, which are obtainable from dithiols, for example ethane-1,2-dithiol or bis(4-mercaptomethylphenyl) ether.

V) Cycloaliphatic epoxy resins, such as bis(2,3-epoxycyclopentyl) ether, 2,3-epoxycyclopentyl glycidyl ether, 1,2-bis(2,3-epoxycyclopentyloxy)ethane or 3,4-epoxycyclohexylmethyl 3',4'-epoxycyclohexanecarboxylate.

VI) Monofunctional epoxy resins, such as 2-ethylhexyl glycidyl ether, isopropyl glycidyl ether, butyl glycidyl ether or cresyl glycidyl ether.

In the context of the presently claimed invention it is likewise possible to use epoxy resins wherein the 1,2-epoxy group is bonded to different heteroatoms or functional groups. These compounds include N,N,O-triglycidyl derivates of 4-aminophenol, the glycidyl ether glycidyl ester of salicylic acid, N-glycidyl-N'-(2-glycidyloxypropyl)-5,5-dimethylhydantoin and 2-glycidyloxy-1,3-bis(5,5-dimethyl-1-glycidylhydantoin-3-yl)propane.

Particularly preferred as component (E) are the compounds of classes (I) and (II), more particularly those of class (II).

The compound (E) containing one or more epoxide groups is used preferably in an amount such that the equivalents ratio of epoxide group to isocyanate group in the polyisocyanates (a) and also, optionally, isocyanate groups contained in the complex compound (Z) is 0.1 to 2.0, preferably 0.2 to 1.8 and more preferably 0.3 to 1.0. A higher epoxide fraction leads to a greater level of exothermic heat production and therefore, in general, to more rapid curing at elevated temperature, and vice-versa.

The molar amount of alkali metal or alkaline earth metal ions per mole of epoxy group is preferably greater than 0.00001 and with particular preference of $\geq 0.00005$ to $\leq 0.3$.

Preferably, compound (E) used in the presently claimed invention are commercially available, for example, under the trade name Epikote™ Resin 828, EPOTEC RD 113, Polypropylene glycol) diglycidyl ether preferably in Mw. 400 and/or Mw. 600 grades from Chemos.

Preferably, the at least one compound (E) comprising one or more epoxide groups (c) has a number average molecular weight in the range of $>300$ g/mol to $\leq 8000$ g/mol. The at least one compound (E) comprising one or more epoxide groups is present in an amount in the range of $\geq 3$ wt. % to $\leq 20$ wt. % based on the total weight of the components (c) to (f).

The at least one aliphatic polyol (P1) used in the presently claimed invention is having a number average molecular weight of $>300$ g/mol determined according to DIN 55672-1. These polyols are preferably having at least two isocyanate-reactive groups and a number average molecular weight in the range of $\geq 500$ g/mol to $\leq 8000$ g/mol, more preferably in the range of $\geq 3000$ g/mol to $\leq 5000$ g/mol, determined according to DIN 55672-1. Representative examples of the at least one aliphatic polyol (P1) which can be used include polyetherols or polyesterols. Preferred polyols (P1) are containing primary OH groups. These polyols (P1) preferably possess a functionality in the range of $\geq 2$ to $\leq 6$, more preferably in the range of $\geq 2$ to $\leq 4$ and even more preferably in the range of $\geq 2$ to $\leq 3$. The hydroxyl number of these polyols (P1) is preferably in the range of $\geq 20$ to $\leq 850$ mg KOH/g, more preferably in the range of $\geq 30$ to $\leq 600$ mg KOH/g, even more preferably in the range of $\geq 30$ to $\leq 400$ mg KOH/g and most preferably in the range of $\geq 50$ to $\leq 400$ mg KOH/g.

The at least one aliphatic polyol (P1) is preferably present in an amount in the range of $\geq 40$ wt. % to $\leq 70$ wt. % based on the total weight of the components (c) to (f).

Preferably the at least one aliphatic polyol (P1) is a polyether polyol. The polyether polyol is obtained in the presence of catalysts by known methods, as for example by anionic polymerization of alkylne oxides with addition of at least one starter molecule, containing $\geq 2$ to $\leq 8$, preferably $\geq 2$ to $\leq 6$ and more preferably $\geq 2$ to $\leq 4$ reactive hydrogen atoms in bound form. Catalysts used may be alkali metal hydroxides, such as sodium or potassium hydroxide, or alkali metal alkoxides, such as sodium methoxide, sodium or potassium ethoxide or potassium isopropoxide, or Lewis acids in the case of cationic polymerization, such as antimony pentachloride, boron trifluoride etherate or bleaching earth as catalysts. As catalysts it is additionally possible to use double metal cyanide compounds, known as DMC catalysts. For polyether polyols having hydroxyl numbers $>200$ mg KOH/g, a tertiary amine, such as imidazole, for example, may also be employed as catalyst. Such polyols are described for example in WO 2011/107367.

As alkylene oxides, use is made preferably of one or more compounds having $\geq 2$ to $\leq 4$ carbon atoms in the alkylene radical, such as ethylene oxide, tetrahydrofuran, 1,2-propylene oxide, or 1,2- and/or 2,3-butylene oxide, in each case alone or in the form of mixtures, and preferably ethylene oxide, 1,2-propylene oxide, 1,2-butylene oxide and/or 2,3-butylene oxide, especially ethylene oxide and/or 1,2-propylene oxide. Starter molecules contemplated include, for example, ethylene glycol, diethylene glycol, glycerol, trimethylolpropane, pentaerythritol, sugar derivatives, such as sucrose, hexitol derivates, such as sorbitol, methylamine, ethylamine, isopropylamine, butylamine, benzylamine, aniline, toluidine, toluenediamine, naphthylamine, ethylenediamine, diethylenetriamine, 4,4'-methylenedianiline, 1,3,-propanediamine, 1,6-hexanediamine, ethanolamine, diethanolamine, triethanolamine, and also other di- or polyhydric alcohols or mono- or polyfunctional amines.

Preferably, the at least one aliphatic polyol (P1) that is used in the presently claimed invention is commercially available, for example, from BASF under the trade name Lupranol® 2095 and Lupranol® 1002/1.

The at least one polyol (P2) is selected from the group consisting of the at least one aliphatic diol or triol having a number average molecular weight of ≤300 g/mol determined according to DIN 55672-1; and the at least one cycloaliphatic diol or triol having a number average molecular weight of ≤300 g/mol determined according to DIN 55672-1. These polyols (P2) are preferably low number average molecular weight compounds having at least two isocyanate-reactive groups and having a weight average molecular weights of ≤300 g/mol, preferably ≥60 g/mol to ≤300 g/mol. The at least one polyol (P2) is preferably present in an amount in the range of ≥4 wt. % to ≤30 wt. % based on the total weight of the components (c) to (f). The hydroxyl number of these polyols (P2) is preferably in the range of ≥600 to ≤2000 mg KOH/g, more preferably in the range of ≥1000 and ≤1200 mg KOH/g.

Preferably the at least one polyol (P2) is selected from the group consisting of ethylene glycol, 1,3-propanediol, 1,4-butanediol, 1,6-hexanediol, 1,10-decanediol, 1,2-, 1,3-, 1,4-dihydroxycyclohexane, diethylene glycol, dipropylene glycol, tripropylene glycol, triols, such as 1,2,4-, 1,3,5-trihydroxycyclohexane, glycerol and trimethylolpropane, and hydroxyl-containing polyalkylene oxides of low molecular weight that are based on ethylene oxide and/or on 1,2-propylene oxide and on the aforementioned diols and/or triols as starter molecules.

More Preferably, the at least one polyol (P2) that is used in the presently claimed invention is diethylene glycol.

The at least one compatibilizer is selected from the group consisting of:
i. at least one aromatic polyol (P3) comprising aromatic groups in the range of ≥5 wt. % to ≤80 wt. % based on the total weight of the aromatic polyol (P3); and
ii. at least one monool (P4) with an average molecular weight in the range of ≥200 g/mol to ≤1000 g/mol
and can also be a mixture of i) and ii).

The at least one aromatic polyol (P3) is a compound comprising at least two aromatically bonded hydroxy groups. These polyols (P3) are preferably obtained via alkoxylation of an aromatic di- or polyol. An example of those polyols (P3) is a bisphenol alkoxylate, i.e. an ethylene oxide or propylene oxide adduct. The at least one aromatic polyol (P3) comprises aromatic groups in the range of ≥5 wt. % to ≤80 wt. %, preferably in the range of ≥30 wt. % to ≤60 wt. %, based on the total weight of the aromatic polyol (P3). The at least one aromatic polyol (P3) has preferably a number average molecular weight in the range of ≥200 g/mol to ≤1000 g/mol, more preferably in the range of >300 g/mol to ≤600 g/mol, even more preferably in the range of >300 g/mol to ≤500 g/mol, determined according to DIN 55672-1. The hydroxyl number of these aromatic polyols (P3) is preferably in the range ≥150 to ≤800 mg KOH/g, more preferably in the range of ≥200 to ≤500 mg KOH/g. It is preferable that the aromatic diol comprises at least two phenol groups, and it is particularly preferable that the aromatic diol comprises a bisphenol, and it is further preferable that the aromatic di- or polyol is a bisphenol.

Bisphenols are compounds having two hydroxyphenyl groups. These comprise bisphenol A (2,2-bis(4-hydroxyphenyl) propane); bisphenol AF (1,1-bis(4-hydroxyphenyl)-1-phenylethane), bisphenol AP (1,1-bis(4-hydroxyphenyl)-1-phenylethane), bisphenol B (2,2-bis(4-hydroxyphenyl) butane), bisphenol BP (bis(4-hydroxyphenyl)diphenyl methane), bisphenol C (2,2-bis(3-methyl-4-hydroxyphenyl) propane), bisphenol E (1,1-bis(4-hydroxyphenyl)ethane), bisphenol F (bis(4-hydroxyphenyl)methane), bisphenol FL (9,9-bis(4-hydroxyphenyl)fluorene), bisphenol G (2,2-bis(4-hydroxy-3-isopropylphenyl)propane), bisphenol M (1,3-bis (2-(4-hydroxyphenyl)-2-propyl)benzene), bisphenol P (1,4-bis(2-(4-hydroxyphenyl)-2-propyl)benzene), bisphenol PH (2,2-[5,5'-bis[1,1'-(biphenyl)-2-ol]]propane), bisphenol S (bis(4-hydroxyphenyl)sulfone), bisphenol TMC (1,1-bis(4-hydroxyphenyl)-3,3,5-trimethylcyclohexane), and bisphenol Z (1,1-bis(4-hydroxyphenyl)cyclohexane), particular preference being given to bisphenol A.

Preferably, the at least one compatibilizer, polyol (P3) used in the presently claimed invention is commercially available, for example, from BASF under the trade name Pluriol® BP30E and Pluriol® BP60E.

The at least one polyol (P3) is preferably present in an amount in the range of ≥30 wt. % to ≤60 wt. % based on the total weight of the components (c) to (f).

The at least one compatibilizer, monool (P4) is an alkylene oxide adduct of the active hydrogen containing compound (H) wherein preferably 40% or more of hydroxyl groups are primary hydroxyl groups. It is commonly alcohols, preferably monoalcohols selected from the group consisting of methanol, ethanol, propanol, butanol, pentanol, hexanol, or longer-chain propoxylated or ethoxylated monools, such as polyethylene oxide) monomethyl ether, such as the monofunctional Pluriol® products from BASF.

With particular preference the monool (P4) used in the presently claimed invention is having a number average molecular weight in the range of ≥200 to ≤1000 g/mol, preferably in the range of ≥300 to ≤900 g/mol and more preferably in the range of ≥400 to ≤600 g/mol. The hydroxyl number of these monool (P4) is preferably in the range of ≥50 to ≤500 mg KOH/g, more preferably in the range of ≥100 to ≤200 mg KOH/g. Preferably, the at least one compatibilizer, monool (P4) that is used in the presently claimed invention is commercially available, for example, from BASF under the trade name Pluriol® A500PE.

The at least one monool (P4) is preferably present in an amount in the range of ≥10 wt. % to ≤40 wt. %, preferably 15 to ≤30 wt. % based on the total weight of the components (c) to (f).

The at least one compatibilizer is preferably present in an amount in the range of ≥10 wt. % to ≤53 wt. % based on the total weight of the components (c) to (f).

The reaction mixture (RM) preferably further comprises fillers and additives. Such substances are stated by way of example in "Kunststoffhandbuch, Volume 7, Polyurethane", Cad Hanser Verlag, 3rd edition 1993, sections 3.4.4 and 3.4.6 to 3.4.11.

The suitable fillers used in the presently claimed invention are selected from the group consisting of charcoal, melamine, resin, cyclopentadienyl resins, graft polymers, cellulose fibers, polyamide, polyacrylonitrile, polyurethane, polyester fibers based on aromatic and/or aliphatic dicarboxylic esters, finely ground quartzes, antigorite, serpentine, hornblendes, amphibols, chrysotile, talc, kaolin, aluminum oxides, titanium oxides, iron oxides, chalk, heavy spar, cadmium sulfide, zinc sulfide, wollastonite, metal fibers, glass fibers, coprecipitates of barium sulfate and aluminum silicate and/or aluminum silicate.

Preferred fillers used are those having an average particle diameter in the range of $\geq 0.1$ to $\leq 500$, more preferably in the range of $\geq 1$ to $\leq 100$ and even more preferably in the range of $\geq 1$ to $\leq 10$ μm. Diameter here in the case of non-spherical particles refers to their extent along the shortest axis in space. In the case of non-spherical particles, examples being fibres, such as glass fibres, the extent along their longest axis in space is preferably less than 500 μm, more preferably less than 300 μm. Preferred for use as fillers are glass fibres or finely ground quartzes. Crosslinked fillers may also be used, examples being woven fabric mats, such as glass fibre mats, carbon fibre mats or natural fibre mats, as fillers. These fillers are identified as reinforcing agents in the context of the presently claimed invention. The inorganic and organic fillers may be used individually or as mixtures and are incorporated into the reaction mixture in advantageous amounts. With preference no fillers are added.

The suitable additives are selected from the group consisting of chain extender, additives for water adsorption, flame retardants, hydrolysis inhibitors, antioxidants, and internal mould release agents.

Preferred additives for water adsorption that are used are aluminosilicates, selected from the group of the sodium aluminosilicates, potassium aluminosilicates, calcium aluminosilicates, caesium aluminosilicates, barium aluminosilicates, magnesium aluminosilicates, strontium aluminosilicates, sodium aluminophosphates, potassium aluminophosphates, calcium aluminophosphates and mixtures thereof. Particular preference is given to using mixtures of sodium, potassium and calcium aluminosilicates in a castor oil vehicle.

The additive for water absorption preferably has an average particle size of $\leq 200$ μm, more preferably $\leq 150$ μm and in particular $\leq 100$ μm. The pore size of the additive of the presently claimed invention for water absorption is preferably $\geq 2$ to $\leq 5$ angstroms. Besides the inorganic additives for water adsorption, it is also possible to use known organic additives for water adsorption, such as orthoformates, an example being triisopropyl orthoformate. The additive for water absorption may be used individually or as mixtures and are incorporated into the reaction mixture in advantageous amounts. With preference no additive for water absorption is added.

If foams are to be produced, it is also possible, instead of water scavengers, to use chemical and/or physical blowing agents that are customary within polyurethane chemistry. Chemical blowing agents are understood to be compounds which as a result of reaction with isocyanate form gaseous products, such as water or formic acid, for example. Physical blowing agents are understood to be compounds which are present in solution or emulsion in the ingredients of polyurethane preparation and which evaporate under the conditions of polyurethane formation. Examples are hydrocarbons, halogenated hydrocarbons, and other compounds, such as, for example, perfluorinated alkanes, such as perfluorohexane, fluorochlorohydrocarbons, and ethers, esters, ketones, acetals or mixtures thereof, as for example (cyclo) aliphatic hydrocarbons having 4 to 8 carbon atoms, or hydrofluorocarbons, such as Solkane® 365 mfc from Solvay Fluorides LLC. With preference no blowing agent is added.

Flame retardants which can be used are, in general, the flame retardants known from the prior art. Examples of suitable flame retardants are brominated ethers (Ixol B 251), brominated alcohols, such as dibromoneopentyl alcohol, tribromoneopentyl alcohol and PHT-4 diol, and also chlorinated phosphates, such as, for example, tris(2-chloroethyl) phosphate, tris(2-chloroisopropyl) phosphate (TCPP), tris(1,3-dichloroisopropyl) phosphate, tris(2,3-dibromopropyl) phosphate and tetrakis(2-chloroethyl)ethylene diphosphate, or mixtures thereof.

Besides the halogen-substituted phosphates already stated, it is also possible for inorganic flame retardants, such as red phosphorus, preparations containing red phosphorus, expandable graphite, aluminium oxide hydrate, antimony trioxide, arsenic oxide, ammonium polyphosphate and calcium sulfate, or cyanuric acid derivatives, such as melamine, or mixtures of at least two flame retardants, such as ammonium polyphosphates and melamine, and also, optionally, starch, to be used in order to impart flame retardancy to the polyurethane-polyisocyanurate foams produced in accordance with the presently claimed invention.

As further liquid, halogen-free flame retardants it is possible to use diethyl ethanephosphonate (DEEP), triethyl phosphate (TEP), dimethyl propylphosphonate (DMPP), diphenyl cresyl phosphate (DPK) and others.

The flame retardant may be used individually or as mixtures and are incorporated into the reaction mixture in advantageous amounts. With preference no flame retardant is added.

Internal mould release agents which can be used are all release agents customary in the preparation of polyurethanes, examples being long-chain carboxylic acid, phosphoric acid, fatty acid selected from the group consisting of stearic acid, amine of long-chain carboxylic acid selected from the group consisting of stearamide, fatty acid ester, metal salt of long-chain carboxylic acid selected from the group consisting of zinc stearate, or silicone and derivatives of polyisobutylenesuccinic acid.

The internal mould release agents may be used individually or as mixtures and are incorporated into the reaction mixture in advantageous amounts.

The polyurethane-polyisocyanurate compounds of the presently claimed invention are prepared by mixing components of steps (a) to (f) and optionally fillers and additives to form a reaction mixture and reacting the reaction mixture to form the polyurethane-polyisocyanurate compound. For the purposes of the presently claimed invention here, the mixture of components of step (a) to (f) is referred to as a reaction mixture at reaction conversions of less than 90%, based on the isocyanate groups. Individual components may already have been premixed. Thus, for example, the at least one polyisocyanate (a) and the mixture (M) obtainable by introducing an alkali metal or alkaline earth metal salt into a compound (Z) may be premixed, provided that compound (Z) contains no isocyanate-reactive groups. Likewise, compounds (E), (P1), (P2), (P3) and/or (P4) and optionally additives and fillers may be premixed. With preference the compounds (E) containing one or more epoxide groups and the one or more compounds having at least two isocyanate-reactive groups (P1), (P2), (P3), and/or (P4), and optionally fillers and additives, are mixed to form a polyol component before being mixed with the at least one polyisocyanate (a).

The polyurethane-polyisocyanurate compound of the presently claimed invention exhibits a long open time at 25° C. which is in the range of $\geq 5$ minutes to $\leq 3000$ minutes, whereby the open time is determined by Shyodu gel timer, model 100, version 2012. Preferably, the open time at 25° C., is in the range of ≥10 minutes to ≤2000 minutes, more preferably in the range of ≥20 minutes to ≤1000 minutes.

The open time is determined via the increase in viscosity as described above. Raising the temperature to temperatures preferably ≥70° C., more preferably in the range of ≥80 to ≤250° C., cures the reaction mixture of the presently claimed invention rapidly, preferably in ≤5 minutes, for example, more preferably in ≤4 minutes, even more preferably in ≤3 minutes, and most preferably in ≤2 minutes. Curing of a reaction mixture of the presently claimed invention refers, for the purposes of the presently claimed invention, to the increase from the initial viscosity to ten times the initial viscosity. The difference between the open time at 25° C. and the open time at 120° C. here is preferably ≥15 minutes, more preferably ≥1 hour and even more preferably ≥2 hours.

The isocyanate index for a process of the presently claimed invention is preferably in the range of ≥300 to ≤1300, more preferably in the range of ≥400 to ≤1000, even more preferably in the range of ≥400 to ≤700. The isocyanate index in the context of the presently claimed invention refers to the stoichiometric ratio of isocyanate groups to isocyanate-reactive groups, multiplied by 100. Isocyanate-reactive groups are all groups reactive with isocyanate that are present in the reaction mixture, including additives and compounds having epoxide groups, but not the isocyanate group itself.

A polyurethane-polyisocyanurate compound is obtained by the process of the presently claimed invention.

The resulting polyurethane-polyisocyanurate compound has outstanding mechanical properties and temperature stability. The polyurethane-polyisocyanurate compound of the presently claimed invention preferably exhibits a glass transition temperature in the range of ≥180° C. to ≤250° C., a heat distortion temperature in the range of ≥140° C. to ≤200° C., and outstanding mechanical properties measured in terms of a tensile strength in the range of ≥55 N/mm$^2$ to ≤80 N/mm$^2$; and e-modulus of ≥2000 N/mm$^2$.

The glass transition temperature is determined by Dynamic Mechanical Analysis (DMA) at a frequency f=1 Hz in accordance with DIN EN ISO 6721-1:2011, and the glass transition temperature Tg is evaluated from the maximum of the loss factor tan d and the loss modulus G. The heat distortion temperature is determined in accordance with DIN EN ISO 6721-1:2011 at a frequency f=1 Hz. The tensile strength and the e-modulus are determined according to DIN EN ISO 527.

A further aspect of the presently claimed invention relates to the polyurethane-polyisocyanurate compound obtainable by the process of the presently claimed invention, and the use of a polyurethane-polyisocyanurate compound of the presently claimed invention for producing a large number of composite materials, for example in resin transfer moulding (RTM), resin injection moulding (RIM) or structural reaction injection moulding (SRIM), for the production, for example, of bodywork components for vehicles, door or window frames or honeycomb-reinforced components, in vacuum-assisted resin infusion, for production, for example, of structural components for vehicles or wind turbines, in filament winding, in order, for example, to produce pressure-stable containers or tanks, in rotational casting, in order, for example, to produce pipes and pipe coatings, and in pultrusion, in order to produce, for example, door profiles and window profiles, fibre-reinforced components for vehicles, wind turbines, antennas or leads and reinforcing rods for concrete. The polyurethane-polyisocyanurate compound of the presently claimed invention may additionally be used for producing prepregs for sheet moulding compounding (SMC) or bulk moulding compound (BMC), for example.

The composites comprising the inventively produced polyurethane-polyisocyanurate compound may additionally be employed, for example, for high-volume production of parts for motor vehicles, components for trains, air travel and space travel, marine applications, wind turbines, structural components, adhesives, packaging, encapsulating materials and insulators. The polyurethane-polyisocyanurate compound of the presently claimed invention can also be used without fibre reinforcement, as pure casting material, as adhesives or coatings for pipe coatings, for example. The polyurethane-polyisocyanurate compound prepared by a process of the presently claimed invention is used preferably for producing bodywork components for motor vehicles, such as bumpers, wheel arches or roof parts.

Surprisingly it has been found that the specific compatibilizer, i.e. polyol (P3) and/or monool (P4), need to be present in the reaction mixture (RM) to obtain the polyurethane-polyisocyanurate compound exhibiting outstanding mechanical properties over the prior art. The polyurethane-polyisocyanurate compounds of the presently claimed invention are notable for outstanding mechanical properties, which can be varied within wide limits.

In the text below, the presently claimed invention is to be illustrated using examples:

Chemicals

Polyol 1 (P1) glycerol-started polyether polyol based on propylene oxide and terminal ethylene oxide, with an OH number of 35 mg KOH/g, a primary OH group content of 72%, based on all OH groups Polyol 2 (P2) Diethylene glycol Polyol 3a (P3) Pluriol® BP30E, bisphenol A ethoxylate with hydroxyl number of 230 mg KOH/g, and number average molecular weight (Mw) of 490 g/mol, available from BASF.

Polyol 3b (P3) Pluriol® BP60E, bisphenol A ethoxylate with hydroxyl number of 313 mg KOH/g, and number average molecular weight (Mw) of 360 g/mol, available from BASF.

Polyol 4 (P4) Pluriol® A 500 PE, a monofunctional polyethylene oxide having a number-average molecular weight of 500 g/mol hydroxyl number of 113 mg KOH/g, available from BASF.

Compound E Epikote® Resin 828, having a number average molecular weight of 700 g/mol and an average Epoxy group content of 5300 mmol/kg, available from Hexion ZM1 Reaction product of Polyisocyanate (a3) with a monofunctional polyethylene oxide having a number-average molecular weight of 500 g/mol, obtainable under the trade name "Pluriol® A 500 E" from BASF, mixed with 0.70 eq. of LiCl, based on the number of urethane bonds in the prepolymer, as described in WO2016/188805.

ZM2 Non-inventive mixture of LiCl and urea prepolymer, obtainable by reaction of Jeffamin M600 and Polyisocyanate (a3) and also 0.70 eq. of LiCl, based on the number of urea bonds in the prepolymer, as described in WO10121898.

Polyisocyanate (a1) Lupranat® MP 102 (isocyanate prepolymer based on 4,4'-diphenylmethane diisocyanate dipropylene glycol and polypropylene glycol, NCO-content 22.9%), available from BASF.

Polyisocyanate (a2) Lupranat® M 20 S, solvent-free product based on diphenylmethane diisocyanate (MDI)

with higher-functionality homologues and isomers, average functionality 2.7., available from BASF.

Polyisocyanate (a3) Lupranat® MM 103, carbodiimide-modified 4,4'-diphenylmethane diisocyanate (MDI), NCO content 29.5%, average functionality 2.2, available from BASF.

In accordance with table 1, a polyol component and an isocyanate component, respectively, were prepared by mixing the specified components. The quantity figures are in parts by weight, based in each case on the polyol component (A component) or the isocyanate component (B component). The respective polyol and isocyanate components were subsequently mixed at the specified mixing ratio. This mixture was reacted in a mould at 120° C. and tempered for 5 min at 200° C. in a heated oven to form the polyurethane-polyisocyanurate compound. The specified mechanical properties were determined on the polyurethane-polyisocyanurate compound thus produced.

Analytical Methods Used:

Glass transition temperature determined by a Dynamic Mechanical Analysis (DMA) at a frequency f=1 Hz. in accordance with DIN EN ISO 6721-1:2011.

Heat distortion temperature determined by DIN EN ISO 6721-1:2011 at a frequency f=1 Hz.

Open time is determined by Shyodu gel timer, model 100, version 2012. For this purpose 200 g portions of reaction mixture were prepared, and were mixed in a Speedmixer at 1950 rpm for 1 minute, and 130 g of the mixture were stirred at room temperature or elevated reaction temperature in the oven, in a PP beaker with a diameter of 7 cm, by means of a Shyodu Gel Timer, model 100, version 2012 and an associated wire stirrer at 20 rpm, until the viscosity and hence the required stirring force for the reactive mixture exceeded the stirring force of the Gel Timer.

Shore D hardness determined according to DIN ISO 7619-1 flexural strength/stress determined according to DIN EN ISO 178

Fracture determined according to DIN EN ISO 178

Tensile strength determined according to DIN EN ISO 527.

Elasticity modulus [N/mm$^2$] determined according to DIN EN ISO 527 and DIN EN ISO 178

Elongation at break [%] determined according to DIN EN ISO 527

Number average molecular weight determined according to DIN 55672-1

TABLE 1

|  | Reference Example | Example 1 | Example 2 | Example 3 | Example 4 | Example 5 | Example 6 | Example 7 | Reference Example 2 |
|---|---|---|---|---|---|---|---|---|---|
| Polyol 1 | 70 | 40 | 40 | 60 | 61 | 53 | 47 | 40 | 70 |
| Polyol 2 | 15 | 5 | 5 | 5 | 13 | 12 | 10 | 5 | 15 |
| Polyol 3a | 0 | 50 | 0 | 0 | 0 | 0 | 0 | 0 | 0 |
| Polyol 3b | 0 | 0 | 50 | 30 | 0 | 0 | 0 | 50 | 0 |
| Polyol 4 | 0 | 0 | 0 | 0 | 13 | 23 | 33 | 0 | 0 |
| Compound E | 15 | 5 | 5 | 5 | 13 | 12 | 10 | 5 | 15 |
| Sum A | 100 | 100 | 100 | 100 | 100 | 100 | 100 | 100 | 100 |
| Polyisocyanate (a1) | 49 | 49 | 49 | 49 | 49 | 49 | 49 | 49 | 49 |
| Polyisocyanate (a2) | 49 | 49 | 49 | 49 | 49 | 49 | 49 | 49 | 49 |
| ZM1 | 2 | 2 | 2 | 2 | 2 | 2 | 2 | | |
| ZM2 | | | | | | | | 2 | 2 |
| Sum B | 100 | 100 | 100 | 100 | 100 | 100 | 100 | 100 | 100 |
| Mixing ratio A:B [parts by wt.] | 100:300 | 100:300 | 100:300 | 100:300 | 100:300 | 100:300 | 100:300 | 100:300 | 100:300 |
| Index | 454 | 431 | 534 | 661 | 522 | 589 | 681 | 454 | |
| Open time at RT | 32:47 | 80:33 | 109:49 | 667:16 | 75:04 | 118:23 | 435:51 | 107:30 | |
| Open time at 120° C. [s] | 00:28 | 00:42 | 00:47 | 00:54 | 0:39 | 0:44 | 0:49 | 1:08 | |
| Demoulding time at 120° C. [s] | 01:24 | 01:47 | 01:41 | 02:00 | 1:26 | 1:37 | 1:42 | 1:51 | |
| Difference Demoulding time – open time at 120° C. [s] | 56 | 65 | 54 | 66 | 47 | 53 | 53 | 43 | |

Table 1 shows that that when using compatibilizers ((P3) and (P4)) the long open times at room temperature are maintained or even better while at the same time open time at 120° C. is longer, but the demoulding time is still quick, which is a very favourable combination.

Especially with ZM 1 this effect is prominent. With ZM 2 the composition has an even longer open time and quick cure.

TABLE 2

|  | Reference Example | Example 1 | Example 2 | Example 3 | Example 4 |
|---|---|---|---|---|---|
| Shore D hardness to DIN ISO 7619-1 | 82 | 83 | 84 | 82 | 83 |
| Flexural strength/stress [N/mm$^2$] to DIN EN ISO 178 | 95.5 | 117 | 114.1 | 105.5 | 102.5 |
| Elasticity modulus [N/mm$^2$] to DIN EN ISO 178 | 1898 | 2485 | 2394 | 2107 | 2050 |
| Tensile strength [N/mm$^2$] to DIN EN ISO 527 | 58.3 | 64.6 | 69.8 | 68.7 | 72.5 |
| Elasticity modulus [N/mm$^2$] to DIN EN ISO 527 | 2011 | 2554 | 2564 | 2284 | 2158 |
| Tg [° C.] by DMA max G" | 210 | 190 | 185 | 205 | 230 |

|  | Example 5 | Example 6 | Example 7 | Reference Example 2 |
|---|---|---|---|---|
| Shore D hardness to DIN ISO 7619-1 | 82 | 82 | 83 | |

TABLE 2-continued

| | | | |
|---|---|---|---|
| Flexural strength/stress [N/mm²] to DIN EN ISO 178 | 105.5 | 107.8 | 123.7 |
| Elasticity modulus [N/mm²] to DIN EN ISO 178 | 2152 | 2176 | 2432 |
| Tensile strength [N/mm²] to DIN EN ISO 527 | 75.1 | 75.2 | 77.3 |
| Elasticity modulus [N/mm²] to DIN EN ISO 527 | 2267 | 2342 | 2491 |
| Tg [° C.] by DMA max G" | 215 | 195 | 190 |

Table 2 shows that only when using compatibilizer ((P3) and (P4)), i.e. polyol 3a, polyol 3b and polyol 4, polyurethane-polyisocyanurates are obtained that have outstanding mechanical properties, especially higher tensile strength and elasticity modulus by maintaining high glass transition temperature at the same time.

The invention claimed is:

1. A process for preparing a polyurethane-polyisocyanurate compound comprising:
   A) mixing the following components to form a reaction mixture (RM) comprising
      a) at least one polyisocyanate,
      b) a mixture (M) obtainable by introducing an alkali metal or alkaline earth metal salt into a compound (Z), selected from the group consisting of:
      R—NH—CO—XR' (Z1), wherein R and R' can be the same or different and can be any radical known in organic chemistry, and X is selected from the group consisting of NH, O and S,
      a compound having at least one —CO—NH—CO— group (Z2), and
      mixtures of (Z1) and (Z2),
      wherein a molar amount of the alkali metal and/or the alkaline earth metal ion in the mixture (M) per mole of the —NH—CO—X— group and —CO—NH—CO— group in the compound (Z) is in the range of ≥0.0001 to ≤3.5, based on the total number of the alkali metal and/or alkaline earth metal ions and the total number of —NH—CO—X— groups and —CO—NH—CO— groups,
      c) at least one compound (E) comprising one or more epoxide groups,
      d) at least one aliphatic polyol (P1) having a number average molecular weight of >300 g/mol,
      e) at least one polyol (P2) selected from the group consisting of:
         i. At least one aliphatic diol having a number average molecular weight of ≤300 g/mol; and
         ii. at least one cycloaliphatic diol having an average molecular weight of ≤300 g/mol; and
      f) at least one compatibilizer selected from the group consisting of:
         i. At least one aromatic polyol (P3) comprising aromatic groups in the range of ≥5 wt. % to ≤80 wt. % based on the total weight of the aromatic polyol (P3); and
         ii. at least one monool (P4) with an average molecular weight in the range of ≥200 g/mol to ≤1000 g/mol;
   and
   B) reacting the reaction mixture (RM) to form the polyurethane-polyisocyanurate compound.

2. The process according to claim 1, wherein the reaction mixture is reacted at an isocyanate index in the range of ≥300 to ≤1300.

3. The process according to claim 1, wherein the at least one aliphatic polyol (P1) has a number average molecular weight in the range of ≥500 g/mol to ≤8000 g/mol.

4. The process according to claim 1, wherein the mixture (M) is obtainable by introducing an alkali metal or alkaline earth metal salt into a compound R—NH—CO—XR' (Z1), wherein X stands for O and R is not hydrogen and is not —COR", R" standing for any radical known in organic chemistry.

5. The process according to claim 1, wherein the at least one aromatic polyol (P3) comprises aromatic groups in the range of ≥20 to 80 wt. % based on the total weight of the aromatic polyol (P3).

6. The process according to claim 1, wherein the at least one aromatic polyol (P3) has a number average molecular weight in the range of ≥200 g/mol to ≤1000 g/mol.

7. The process according to claim 1, wherein the at least one monool (P4) is an alkylene oxide adduct of an active hydrogen-containing compound (H), wherein 40% or more of hydroxyl groups are primary hydroxyl groups.

8. The process according to claim 1, wherein the at least one compatibilizer is present in an amount in the range of ≥10 wt. % to ≤60 wt. % based on the total weight of the components (c) to (f).

9. The process according to claim 1, wherein the mixture (M) of step (b) is present in an amount in the range of ≥1 wt. % to ≤5 wt. % based on the total weight of the components (a) and (b).

10. The process according to claim 1, wherein the at least one compound (E) comprising one or more epoxide groups (c) is present in an amount in the range of ≥3 wt. % to ≤20 wt. % based on the total weight of the components (c) to (f).

11. The process according to claim 1, wherein the at least one aliphatic polyol (P1) is present in an amount in the range of ≥40 wt. % to ≤70 wt. % based on the total weight of the components (c) to (f) and the at least one polyol (P2) is present in an amount in the range of ≥4 wt. % to ≤30 wt. % based on the total weight of the components (c) to (f).

12. The process according to claim 1, wherein the alkali metal or alkaline earth metal salt is a salt of sodium, lithium, magnesium and potassium.

13. The process according to claim 1, wherein the reaction mixture (RM) further comprises fillers and additives.

14. A polyurethane-polyisocyanurate compound obtainable according claim 1.

15. The polyurethane-polyisocyanurate compound according to claim 14, wherein the polyurethane-polyisocyanurate compound has
   i. a heat distortion temperature in the range of ≥140° C. to ≤200° C. determined by DIN EN ISO 6721-1:2011 at a frequency f=1 Hz;
   ii. a tensile strength in the range of ≥55 N/mm² to ≤80 N/mm² determined according to DIN EN ISO 527; and
   iii. an e-modulus of >2000 N/mm² determined according to DIN EN ISO 527.

16. A method of using a polyurethane-polyisocyanurate compound according to claim 14 for producing bodywork components for vehicles.

17. The process according to claim 1, wherein the at least one compatibilizer comprises the at least one aromatic polyol (P3) comprising aromatic groups in the range of ≥5 wt. % to ≤80 wt. % based on the total weight of the aromatic polyol (P3).

* * * * *